United States Patent [19]

Sutch

[11] 4,025,255
[45] May 24, 1977

[54] APPARATUS FOR MAKING LIDS OR CONTAINERS

[75] Inventor: Brian Leo Chudleigh Sutch, Thames Ditton, England

[73] Assignee: Airfix Industries Limited, Surrey, England

[22] Filed: June 2, 1976

[21] Appl. No.: 691,985

[30] Foreign Application Priority Data

June 10, 1975 United Kingdom ............ 24894/75

[52] U.S. Cl. .................. 425/114; 425/121;
  425/124; 425/126 R; 425/809
[51] Int. Cl.² ........................... B29F 1/10
[58] Field of Search .......... 425/110, 113, 114, 121, 425/124, 126 R, 809

[56] References Cited

UNITED STATES PATENTS

| 1,546,904 | 7/1925 | Kintzele | 425/126 X |
| 3,001,506 | 9/1961 | Ford | 425/809 X |
| 3,859,018 | 1/1975 | Gugler | 425/126 R |

FOREIGN PATENTS OR APPLICATIONS 486,963  9/1952  Canada .......................... 425/121

Primary Examiner—Robert L. Spicer, Jr.
Attorney, Agent, or Firm—Scrivener Parker Scrivener & Clarke

[57] ABSTRACT

Apparatus for making a composite container comprising a blank and an injection moulding thereon, the apparatus comprises a pair of tools relatively movable between open and closed conditions in the latter of which they define a mould cavity for receiving a blank and injected mouldable material, and a pair of guides for holding a blank between the tools in their open condition, the blank being positioned to be engaged by one tool in its movement to the closed tool condition between the guides, the guides being insufficiently spaced apart to allow said movement of the one tool in their guiding condition, wherein each guide in the region of movement of the one tool therebetween includes a member movable between an operative guiding position and an inoperative position permitting said movement of the one tool by relative movement of the one tool and the guides.

7 Claims, 8 Drawing Figures

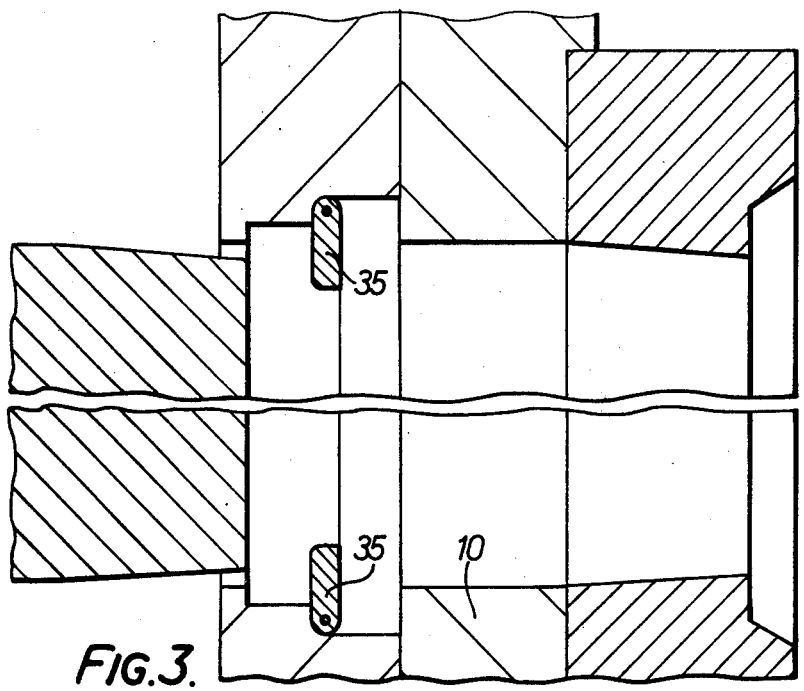
FIG.3.
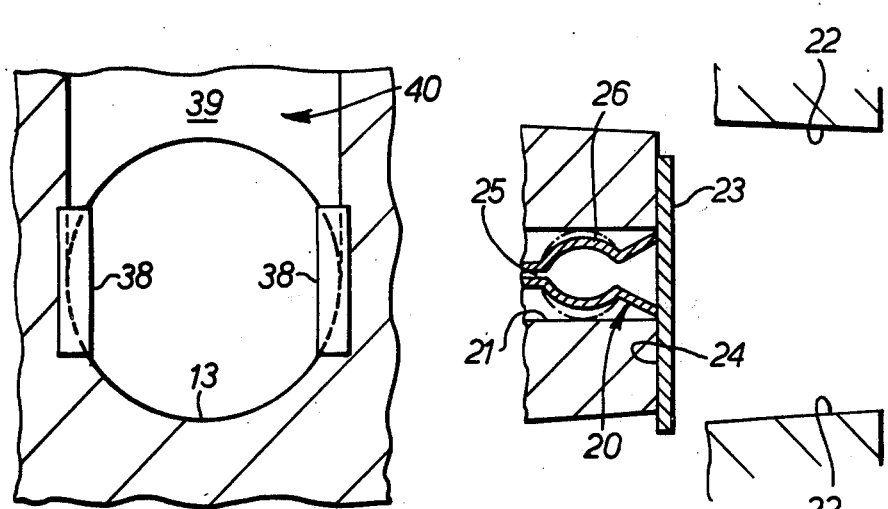
FIG.4.
FIG.5.

APPARATUS FOR MAKING LIDS OR CONTAINERS

This invention is concerned with improvements in and relating to the production of composite lids or shallow containers and more particularly with apparatus for making such lids or containers.

In co-pending British applications Nos. 45845/72 and 29855/73 there are described constructions of lid among which are basically round lids made up of a blank of paper, board, plastics or metal foil on the periphery of which is formed an injection moulding. In co-pending British application No. 27981/73 there is described apparatus for making such lids which includes a core tool, a cavity tool and guide rails for feeding each to a position between a core tool and a cavity tool when these tools are in the open or separated condition.

One of the problems associated with such apparatus is a difficulty which arises because the blank is of the same order of size as the leading face of the core tool. To feed a blank to a position between the core tool and cavity, from which position the core tool can drive the blank into the cavity tool when the tools close, the blank is preferably dropped under gravity along a pair of guide rails. These are channel section and each rail has its open side directed toward the other rail. The closed sides of the rails are spaced by a distance greater than the diameter of a blank, where a blank is circular. The parallel sides of each channel rail project from the closed side toward the other rail and their free edges must be spaced from the free edges of the parallel sides of the other rail by a distance less than the diameter of the blank so that the respective pairs of parallel sides can guide the blank. Now the core tool, if it is to drive the blank from a position in the guide rails to the cavity tool, must pass between the rails.

According to one aspect of this invention there is provided a machine for making composite articles, the machine including a first tool and a second tool relatively movable between an open condition and a closed condition in which they define a mould cavity for receiving a blank and for injected material to be moulded in contact with the blank, and a pair of guides movable to the first tool and situate, when the tools are in the open condition, to feed a blank to a position extending across and in the path of relative movement of the tools to the closed condition, the guides comprising two channel section members, the bases of which are spaced to allow a blank to travel under gravity therebetween while received between parallel side members of each guide, each guide at the region of the path of relative movement of the first tool and movable guides comprising at least one movable member, movable between a guide position in extension of that side member nearest the second tool and an inoperative position by relative movement of the guide and the first tool.

To feed blanks to a multi-impression apparatus where one pair of tools is above the other, two pairs of guides are provided, one pair for feeding blanks to the upper pair of tools and one pair to feed blanks to the lower pair of tools. The pair of guides for the upper pair of tools is preferably the pair nearest the first tool of that pair of tools. This leads to a problem in that the first tool of each pair may have a suction facility for drawing a blank on to it and holding it there during tool closing. Now a blank travelling down the pair of guides serving the lower pair of tools may be sucked on to the upper first tool if the blank for that tool drops later than the blank for the lower tool and vacuum is 'on' at the leading face of that upper first tool. It is therefore a feature of this invention that means are provided in respect of each pair of guides which will allow blanks to travel down the guides sequentially, the blank for the upper first tool first and then the blank for the lower first tool therebelow. Thus the upper first tool leading face is sealed by its own blank before the other blank appears adjacent the front face of that same tool on its way to the lower tool. When it does appear opposite the upper tool it will drop past that tool without any interference.

In order that the present invention may be well understood there will now be described some embodiments, given by way of example only, reference being had to the accompanying drawings, in which:

FIG. 3 is a section on the line III—III of FIG. 2;

FIG. 4 is a section on the line IV—IV of FIG. 2;

FIG. 5 is a detail of suction head on a core tool;

Figure 1:
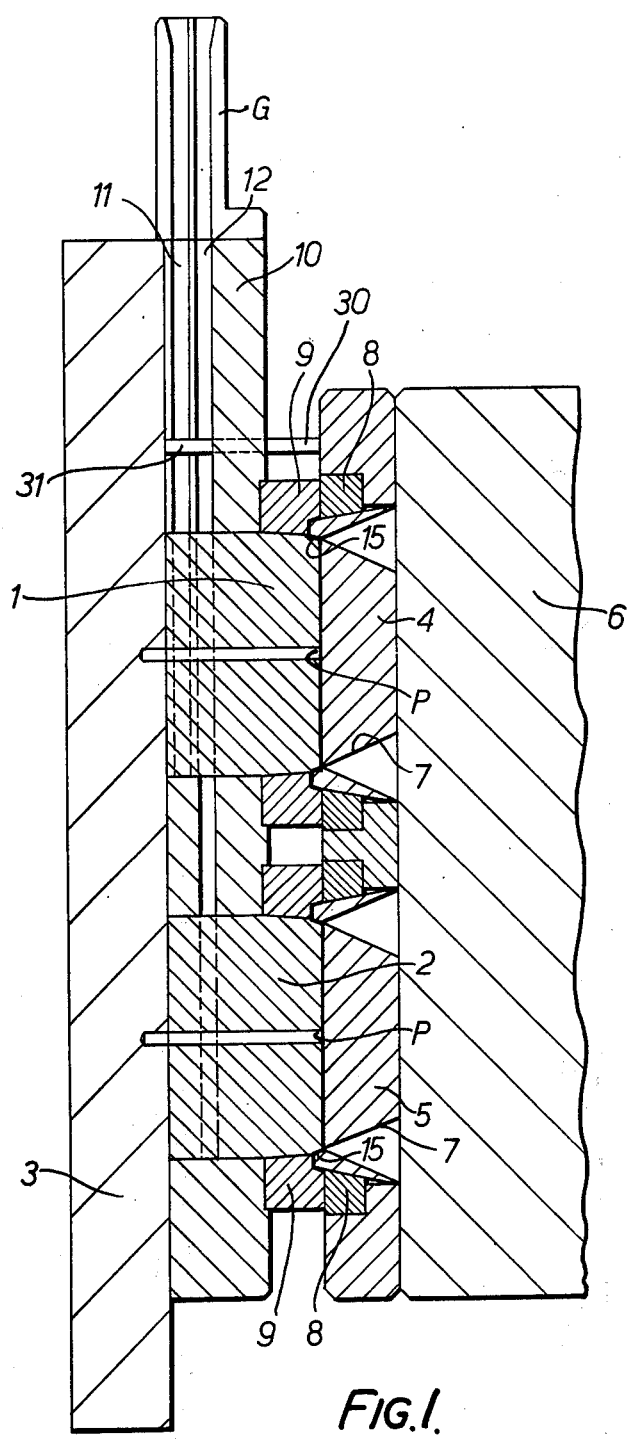
FIG. 1 is a diagrammatic section through a multiimpression injection moulding tool with one pair of tools above another and with the tools of each pair in the closed condition.

Referring to FIG. 1, the injection moulding machine includes a pair of core tools 1, 2, one above another carried on a plate 3. These core tools co-operate with first base cavity tools 4, 5 mounted on a fixed platen 6, in which are hot runner nozzels 7 (FIG. 1 only), ejectors 8 and second cavity tools 9 carried on a moving plate 10. Plate 10 defines two pairs of guides 11, 12, guides 11 serving upper tool 1 and channels 12 lower tool 2.

Figure 2:
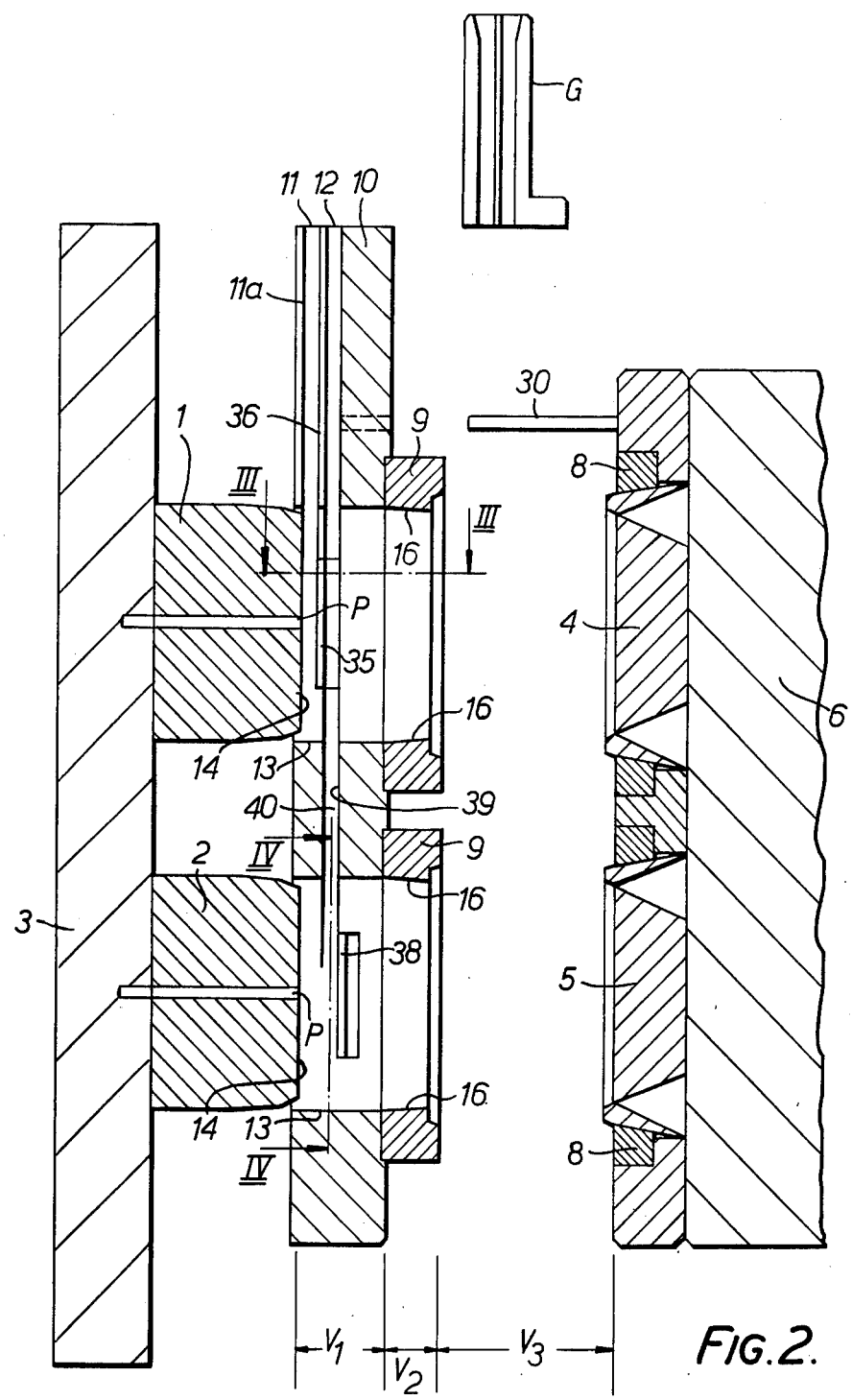
FIG. 2 is a section through the same machine with the tools open.

When the tools are open, the condition shown in FIG. 2, a blank, in this case circular, is dropped down each pair of guides to stop surfaces 13, thereby positioning a blank opposite leading face 14 of each core tool. When the tools close, core tools 1, 2 advance into aperture in plate 10 carrying the blanks forward. Vacuum is applied at ports P in each leading face to apply each blank to its associated leading face. As the plate 3 advances, the plate 10 is carried forward and the tools close. Injection then occurs to form a rim around the blank in a rim cavity 15 defined by each core tool and its associated tools. The tools open, ejectors 8 move to push the completed lids off the base cavity tool and the operation is repeated.

The blanks substantially match the leading faces of the core tools and to allow ready travel of the blanks down the guides, the bases of the guides of each pair are spaced more than the diameter of a blank. Therefore each blank may be eccentric transversely relative to the leading face when that face first encounters a blank. Furthermore, since each blank stop surface 13 is lower than the lowest point of each leading face, the blanks are eccentric relative to the leading faces transversely and in the vertical direction. To obtain concentricity the vacuum at the leading face may be varied as the tools close and convergent guide surfaces 16 may be provided in each second cavity tool. In operation as the tools close, a first level of vacuum is applied as each leading face moves to abut a blank over a distance $V_1$ (FIG. 2). When the blank approaches the convergent surfaces 16 the pull applied by vacuum on each blank is reduced so that the blank can be moved transversely of its leading face, if it is eccentric, by those convergent surfaces. This part of the travel is indicated at $V_2$. When the blank is at its final position axially of the second cavity tool the pull on the blank is increased again to firmly hold the blank as the tools finally close over the travel $V_3$.

In an alternative arrangement, each core tool includes a suction head 20 (FIG. 5) which may be a slack fit in a bore 21 in the head so that convergent surfaces 22 can displace a blank 23 transversely on leading face 24 to centre the blank. As shown however, the suction head has a stem 25 with a resilient bulbous part 26 which normally fits the bore (the broken line condition shown). When in its normal condition, the bulbous portion centres the stem and the suction head. When the vacuum is applied within the suction head stem the bulb partially collapses (to the full line condition shown) to provide the play needed to permit the convergent surfaces to centre the blank.

It will be readily appreciated that the guide flanges cannot extend into the apertures in plate 10 and must be interrupted at the apertures in the plate 10 to allow the core tools to pass as the tools close. Accordingly, the blanks are not well supported in the region of the apertures either in their final positions or while in transit in the case of the blank for the lower tool. In fact in FIG. 2 the core tools are shown in an exaggerated open condition for illustration and would normally have their leading faces almost in the plane of flanges 11a of rail 11.

One result is that if vacuum is 'on' at the leading face of core tool 1 and the blank for core tool 2 drops down ahead of that for core tool 1, the tool 1 may draw the blank for tool 2 out of its proper path and on to the face of tool 1. The other blank will then arrive opposite that tool, will overlie the first blank and a reject article will be produced, or the machine will sense the absence of a blank at core tool 2 and stop until the fault is cleared.

A first solution to this problem is to provide a stop pin or pins 30 on the base 6 each of which, when the tools are in the closed condition, penetrates plate 10 and forms a stop 31 in respect of each pair of guide rails (see FIG. 1). During a moulding cycle with tools closed, a blank is fed via a feed guide G to each pair of guides and is held on the stop pin or pins. When the tools open, each pin withdraws from the pairs of guide rails sequentially, thereby ensuring feed of the blank for core tool 1 before feed of the blank to core tool 2. Thereby the leading face of tool 1 will be sealed in relation to the blank for tool 2 by its own blank before the other blank for tool 2 passes it.

Another aspect of the invention is the provision of displaceable stop means in the guide flanges of at least that pair which feeds the lower tool 2, at the interruption in the region of the path of core tool 1 and at least on that side nearest core tool 1 in the open condition.

Preferably however such stop means are provided in respect of each pair of guides as will appear. Referring to FIGS. 2, 3 and 4, stop rails 35, pivoted about a vertical axis, each form a prolongation flange 36 common to both pairs of guides and projects into the path of core tool 1 at the aperture in plate 10. In the aperture of plate 10 for core tool 2, the stop rails 38, also pivoted about vertical axes, each form a continuation of a face 39 of a guide slot 40 in plate 10. These stop rails are biased to project into the path of the associated core tools. The function of rail 35 is, with the leading face of core tool 1, to position a blank for core tool 1 in a direction parallel with the path of that tool, and to prevent a blank for core tool 2 switching into the guides of core tool 1. The stop rails 38, with the leading face of core tool 2 position the blank for that tool in the direction of travel of that tool.

Figure 6:
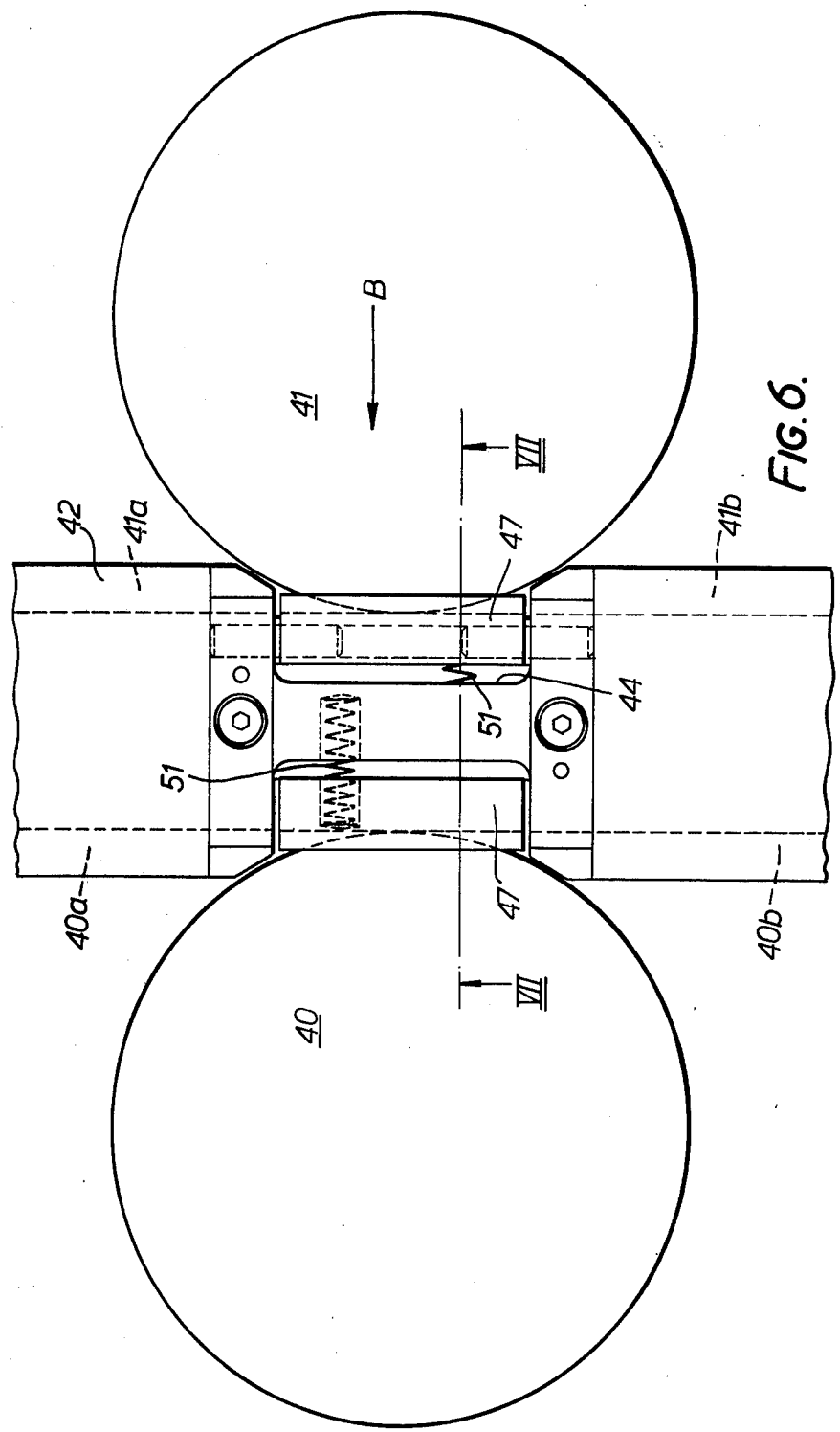
FIG. 6 is a front elevation of a central guide rail of a four impression tool illustrating another embodiment of displaceable stop rail.
Figure 7:
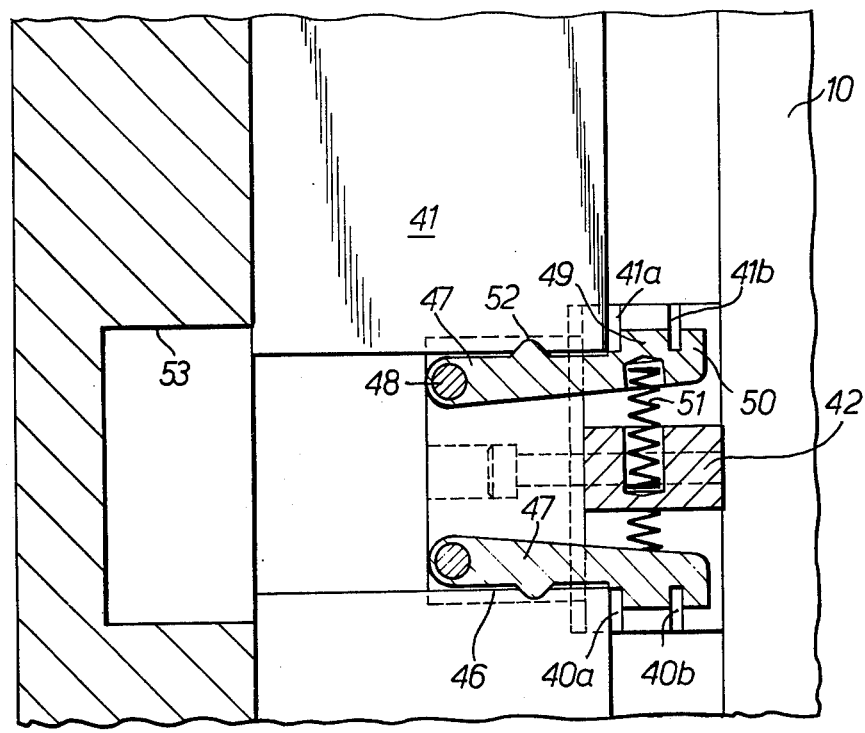
FIG. 7 is a scrap section on the line A—A of FIG. 6 with one guide member omitted.
Figure 8:
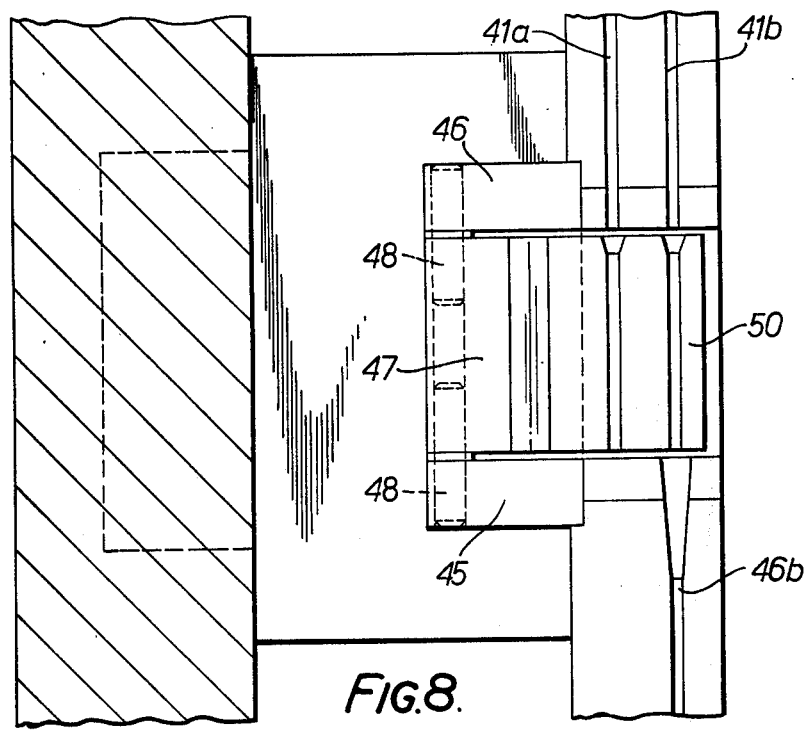
FIG. 8 is a view on arrow B of FIG. 6.

Referring to FIGS. 6 and 7, there is shown another embodiment of displaceable stop rail to provide guidance of a blank with the tools open and allow passage of a core tool to the closed condition. In these Figures a four impression tool is considered of which the two upper side-by-side core tools are shown at 40, 41. Each of tools 40, 41 is served by a pair of guides, the innermost (relative to the machine centre line) guide of each pair being provided by a common element 42. This element and those forming the outer one of each pair of guides are, in this embodiment, formed independently of plate 10, an arrangement which could also be adopted in respect of FIGS. 1 and 2 if desired. Such independently formed elements are secured to the face of plate 10 remote from the fixed platen.

Element 42 and the outer elements also form pairs of guides for the two lower tools of the four impression tool. Thus on each outwardly directed face of element 42 there are guides 40a and 41a for the upper tools and guides 40b and 41b for the lower tools.

At the region of each upper core tool the element 42 is recessed at 44 on each outwardly directed face and a pair of blocks 45, 46 is provided on the face remote from the fixed platen. Between the blocks are received guide members 47 pivoted on pins 48 set in the blocks. Each guide member 27 has a pair of flanges 49, 50 and is biased to urge those flanges into the path of the nearest core tool by springs 51.

In the open condition of the tools (shown) a projection 52 on each guide member engages a recess or step in the adjacent core tool or a wear strip provided on the core in which condition the flanges 49, 50 and the leading face of the adjacent core tool form continuation of guides 40a, 41a, 40b and 41b. When the tools start to close, projection 52 is forced out of the recess in the core tool thereby displacing flanges 49, 50 out of the path of that core tool.

A similar arrangment is provided in respect of the lower core tools on element 42, but serving only to form a continuation of that side of each of guides 40b, 41b remote from the core tools. Similarly in the outer elements (not shown) displaceable elements are provided complimentary to those on element 42. Plate 3 is recessed at 53 to accommodate the blocks 46.

Various modifications may be adopted in relation to each aspect of the invention. For example, instead of the stop pins being such as to serve both pairs of guides, they may serve only that pair feeding tool 2, the core tool 1 serving as the stop pin for its pair of guides, and the opening sequence releasing the blank for tool 2 after the release of the blank for tool 2. This gives a longer lead for the blank for core tool 1.

I claim:

1. A machine for making composite articles, the machine including a first tool and a second tool relatively movable between an open condition and a closed condition in which they define a mould cavity for receiving a blank and for injected material to be moulded in contact with the blank, and a pair of guides movable relative to the first tool and situate, when the tools are in the open condition, to feed a blank to a position extending across and in the path of relative movement of the tools to the closed condition, the guides comprising two channel section members, the bases of which are spaced to allow a blank to travel under gravity therebetween while received between parallel side members of each guide, each guide at the region of the path of relative movement of the first tool and movable guides comprising at least one movable member, movable between a guide position in extension of that side member nearest the second tool and an inoperative position by relative movement of the guide and the first tool.

2. A machine according to claim 1 in which each movable guide is pivotally mounted, is biased to the guide position and includes means engageable by a cam surface on the first tool operable to displace the movable guide out of the path of the first tool when that tool moves relatively to the guide toward the closed condition.

3. A machine according to claim 1 including two first tools one above another, a pair of guides being provided for the upper tool and a pair for the lower tool, an upper movable guide being provided in respect of each guide of the pair of guides of the upper tool having a movable member which will be an extension of that side member of the associated guide for that tool nearest the second tool and a pair of movable members which will be extensions of the side members of the guide for the lower tool and a lower movable guide being provided in respect of each guide of the pair of guides for the lower tool, each lower guide including a movable member being an extension of that side member of the associated guide for that tool nearest the second tool.

4. A machine in accordance with claim 3 in which displaceable stop means are provided which in the closed condition of the tools form stops for blanks fed to the guides when the tools are closed and which upon relative movement of the tools to the open condition move out of the path of the blank for the upper first tool before movement out of the path of the blank for the lower first tool.

5. A machine according to claim 4 in which the stop means comprise a stop element carried by the second tool and extending across the blank path defined by the pair of guides for the lower tool.

6. A machine according to claim 5 in which means coupled to the upper first tool form the stop means for the pair of guides for the upper tool.

7. A machine according to claim 5 in which the stop element spans the path of the blank for each first tool.

* * * * *